United States Patent

Käsler et al.

[11] Patent Number: 5,961,260
[45] Date of Patent: Oct. 5, 1999

[54] MACHINE FOR PRODUCING SPIRAL-TOOTHED BEVEL GEARS

[75] Inventors: Norbert Käsler, Wuppertal; Dieter Krause, Wermelskirchen; Harald Lamsfuss, Wipperfurth; Klaus Ozdyk, Ludenscheid; Dieter Wiener, Ettlingen, all of Germany

[73] Assignee: Klingelnberg Söhne GmbH, Remscheid, Germany

[21] Appl. No.: 08/966,172

[22] Filed: Nov. 7, 1997

[51] Int. Cl.⁶ .................................................. B23F 5/20
[52] U.S. Cl. ........................................ 409/25; 409/137
[58] Field of Search ............................... 409/25, 27, 28, 409/29, 137, 185, 190, 191, 198, 224

[56] References Cited

U.S. PATENT DOCUMENTS

| 3,485,138 | 12/1969 | Staehle | 409/137 |
| 4,484,387 | 11/1984 | Nachmany | 409/137 |
| 5,800,103 | 9/1998 | Stadtfeld et al. | 409/27 |

FOREIGN PATENT DOCUMENTS

| 24 27 148 A1 | 2/1975 | Germany. | |
| 34 04 838 A1 | 8/1984 | Germany. | |
| 255 296 A1 | 3/1988 | Germany. | |
| 39 21 649 C2 | 12/1993 | Germany. | |
| 506931 | 12/1954 | Italy | 409/27 |
| 82149 | 7/1981 | Japan | 409/137 |
| 221316 | 9/1991 | Japan | 409/27 |
| 724287 | 3/1980 | U.S.S.R. . | |
| WO 89/01838 | 3/1989 | WIPO . | |

OTHER PUBLICATIONS

German Handbook for Machine Construction by W. Beitz.
Kegelrader (Bevel Gear) article of Hermann J. Stadtfeld.
German Office Action from related German patent application dated Jul. 28, 1997.

*Primary Examiner*—Daniel W. Howell
*Attorney, Agent, or Firm*—Akin, Gump, Strauss, Hauer & Field, L.L.P.

[57] ABSTRACT

A CNC machine for producing spiral-toothed bevel gears is described, which has a first carriage supporting a tool spindle and is displaceable in height, and whose guide is disposed on a lateral surface of a machine housing, which is horizontally guided in a straight coordinate axis on a machine base. The tool spindle axis is parallel with the lateral surface and with the coordinate axis. Furthermore, the machine has a workpiece spindle support having a second carriage and a pivoting device with a vertical axis and is also horizontally guided on the machine base. The parallel arrangement of the tool spindle axis results in a new machine concept with a compact structure and optimal chip flow. Therefore the machine is particularly suited for heavy-duty dry milling. Since the tool spindle is not located above the area of the machine having a horizontal guide, it is possible to arrange a chip collector underneath the tool spindle, which can be reached by the chips essentially under the force of gravity.

9 Claims, 1 Drawing Sheet

MACHINE FOR PRODUCING SPIRAL-TOOTHED BEVEL GEARS

FIELD OF THE INVENTION

The invention relates to a machine for producing spiral-toothed bevel gears, in particular a CNC machine, with a first carriage which supports a tool spindle and is displaceable in height, whose guide is disposed on a lateral surface of a machine housing, which is horizontally guided in a straight coordinate axis on a machine base, wherein the tool spindle axis is parallel with the lateral surface, and with a workpiece spindle support having a second carriage and a pivoting device with a vertical axis, which is also horizontally guided on the machine base.

BACKGROUND OF THE INVENTION

Gear cutting machines for bevel gears, wherein the conventional generating cradle or generating drum has been replaced by a type of a compound carriage, are usually embodied in accordance with the following concept: a tool or cutter head spindle and its drive are located on a first carriage, which performs the vertical portion of the former generating drum rotation. For its part, this carriage is guided on a machine housing, which is displaced on a horizontal guide of the machine base in order for the cutter head to dip into the workpiece. The horizontal part of the former generating drum is in this case performed by a workpiece spindle support. Examples of such machines are recited in what follows.

A problem in the design of such gear cutting machines is the fact that chips generated in the course of gear cutting remain on the horizontal guide tracks on the machine base or on their cover. During wet milling they must be conveyed away by a strong oil flow. With a weak oil flow or with gear cutting without oil, so-called dry milling which is desired for ecological reasons today, considerable problems arise on account of the chips. Since during dry milling the chips absorb 80% of the heat, heat distortion of the guides and of the machine housing and therefore inaccuracies and impediments in the feed movement can arise. Chip removal is expensive, both in connection with wet and dry milling, if machine damage is to be prevented. The ergonomic arrangement of the operating elements is also important when designing such gear cutting machines in order to assure the rapid and safe set-up of the machine tools. This means that for an operator in particular the tool and the workpiece must be easily accessible for changing without having to bend over into the machine.

A machine of the type described in the field of the invention, which is constructed in accordance with the above concept, is represented in USSR Letters Patent 724 287. The tool spindle axis of this machine is arranged at right angles to the straight coordinate axis of the machine housing, in which the machine housing is horizontally guided on the machine base. Furthermore, the tool spindle is located on a side of the machine housing facing away from the operator. A change in tools is therefore connected with a corresponding elaboration. Since furthermore in this embodiment the place where the tool and the workpiece are in engagement during gear cutting is located above the machine base, an accumulation of chips on the machine base and on the guides cannot be avoided.

CNC gear cutting machines are described in the international patent publication WO 89/01838 and in East German Letters Patent 255 296 A1, wherein the tool spindle is respectively disposed parallel with the straight coordinate axis of the machine housing and at right angles to a lateral surface of the machine housing, wherein the respective lateral surface also extends at right angles to the straight coordinate axis of the machine housing. The mentioned chip accumulation therefore also occurs on the guides and on the machine base of these known gear cutting machines. It is furthermore necessary for an operator to bend over into the machine for changing the tool and/or the workpiece.

An advantageous chip run-off into an appropriate collection chamber is assured with lathes, such as are known from German Published, Non-Examined Patent Application DE-OS 24 27 148 or from German Letters Patent 3 921 649. But these are machine tools of a different type, which are not constructed in accordance with the compound carriage concept.

As already mentioned above, in gear cutting machines the operating elements should be ergonomically arranged. This requirement is met, for example, by the gear cutting machine known from the above mentioned East German Letters Patent 255 296 A1, wherein with manual feeding the workpiece can be moved to the operator. The gear cutting machine known from USSR Letters Patent 724 287 mentioned further above does not meet this requirement.

The efficient operation of the known gear cutting machines is furthermore made more difficult because of their high degree of susceptibility to dirt, besides the unergonomic arrangement of the operating elements.

OBJECT AND SUMMARY OF THE INVENTION

It is an object of the present invention to improve the design of a machine for producing spiral-toothed bevel gears, in particular a CNC machine, with a first carriage which supports a tool spindle and is displaceable in height, whose guide is disposed on a lateral surface of a machine housing, which is horizonally guided in a straight coordinate axis on a machine base, wherein the tool spindle axis is parallel with the lateral surface, and with a workpiece spindle support having a second carriage and a pivoting device with a vertical axis, which is also horizontally guided on the machine base, in such a way that it permits ergonomic operation, but no movement deviation.

This object is attained by a machine of the type mentioned at the outset by means of the lateral surface being selected in such a way that the tool spindle axis extends parallel with the straight coordinate axis.

Advantageous embodiments are the subject of the dependent claims.

Since with the machine in accordance with the invention the tool spindle axis is parallel with the lateral surface of the machine housing on which the first carriage is disposed, the operating elements of the machine can be arranged in such a way that an ergonomical operation is possible. It is possible in this case to arrange both carriages on the same side, viewed from the position of the operator, which allows a simple, safe and efficient operation of the machine. The mechanical structure of the machine in accordance with the invention is such that with manual feeding the workpiece is moved to the operator. Because of this the machine in accordance with the invention is also particularly ergonomic. No bending into the machine is required for changing a workpiece. Because of the arrangement in close proximity to the machine housing and the workpiece spindle support in the machine in accordance with the invention, the optimal distribution of the movements on the tool and workpiece sides is possible with an optimal flow of force, because of which a maximum process stiffness can be achieved. This is of importance, since with CNC machines the static stiffness of the machine must be as large as possible, the same as with mechanical machines. However, this is not the only determining parameter with CNC machines. Because of the control circuits which consist of an actuator (servo motor and machine element), controller (CNC and axis actuator) and a position sensor (measuring system), a much more complex technical control behavior results. This pertains in particular to the movement deviation which, in CNC machines, is a function of the static stiffness and the quality of the control circuits, besides an effective chip and heat removal. Static stiffness is optimally assured with the machine in accordance with the invention, since the arrangement of the operating elements makes short and very stiff drive trains possible. The close arrangement next to each other of the tool spindle support and the machine housing furthermore allows a very compact structure of the machine in accordance with the invention possible.

If in an embodiment of the invention the lateral surface is furthermore selected in such a way that the tool spindle is not located above an area of the machine including a horizontal guide of the workpiece spindle support or of the machine housing, into which chips could be introduced during the operation, no horizontal guides, which could become soiled by chips, are located in this area. This area of the machine can furthermore be used for other uses than guiding. A completely unhindered access to at least the first carriage of the machine is furthermore possible, which simplifies the maintenance of the carriage and the changing of the tools.

If a chip collector is arranged underneath the tool spindle, which the chips essentially reach under the effects of gravity, the chips can be caught in a simple manner and removed. In this case the machine base can be usefully recessed at least at the place where the chip collector will be arranged. Since, as explained above, the chips take 80% of the heat along with them during dry milling, heating of the machine base is also prevented by means of the chip collector. Therefore the requirement is met to provide for the fastest possible removal of the chips during dry milling and to prevent their contact with the machine base or other parts of the machine as much as possible.

If in a further embodiment of the invention the workpiece spindle and the tool spindle are arranged in such a way that in the course of gear cutting the workpiece and the tool come into engagement at a place which is essentially located above the area of the machine which is free of the horizontal guide, it is even more assuredly provided that during dry milling the chips do not come into contact with parts of the machine which could be endangered by heat effects.

If in a still further embodiment of the invention the first carriage has a guide in a further straight coordinate axis, the Z-axis, which is inclined in respect to the vertical direction, this represents an inclined base arrangement in which the base of the machine housing can be made particularly wide in the direction transversely to the tool spindle axis. This leads to an especially large machine stiffness. A more advantageous chip conveyance into the chip collector also results from the inclined base arrangement, which is advantageous particularly in connection with dry milling. In this embodiment the machine in accordance with the invention is conceived for an optimal chip flow. Since the essential portion of the heat generated in the course of dry milling is removed by means of the chips, the inclined base arrangement makes it possible in a particularly safe manner that the thermal influence of the chips is removed in that the chips are not even brought into contact with the machine base or other functional elements of the machine, but instead drop into the chip collector as soon as possible. Although this is also the case with other embodiments of the machine in accordance with the invention, the inclined base arrangement offers the best conditions. Thus, by means of the special conception of the inclined base arrangement, the machine is not only especially stiff, but also especially well suited for dry milling.

The compact side by side arrangement of the machine housing and the workpiece spindle support, which is made possible by the arrangement in accordance with the invention of the tool spindle axis, offers the further advantage that to prevent falling of chips, the machine can be completely encapsulated. It is possible to provide covers which are designed so they are inclined toward the chip collector and guide those generated chips, which do not directly fall into the chip collector, to it. It is furthermore possible to provide sheathing, in particular between the machine housing and the workpiece spindle support, which protects both the second carriage and the pivoting device from falling chips. A chip guide constructed in this way with the aid of guide surfaces on the cover and the sheathing makes the machine in accordance with the invention particularly well suited for heavy-duty dry milling. But these advantages are also fully realized if it is intended to perform wet-milling for reasons of technology.

An exemplary embodiment of the invention will be described in more detail below, making reference to the attached drawings.

DETAILED DESCRIPTION OF THE INVENTION

Figure 1:
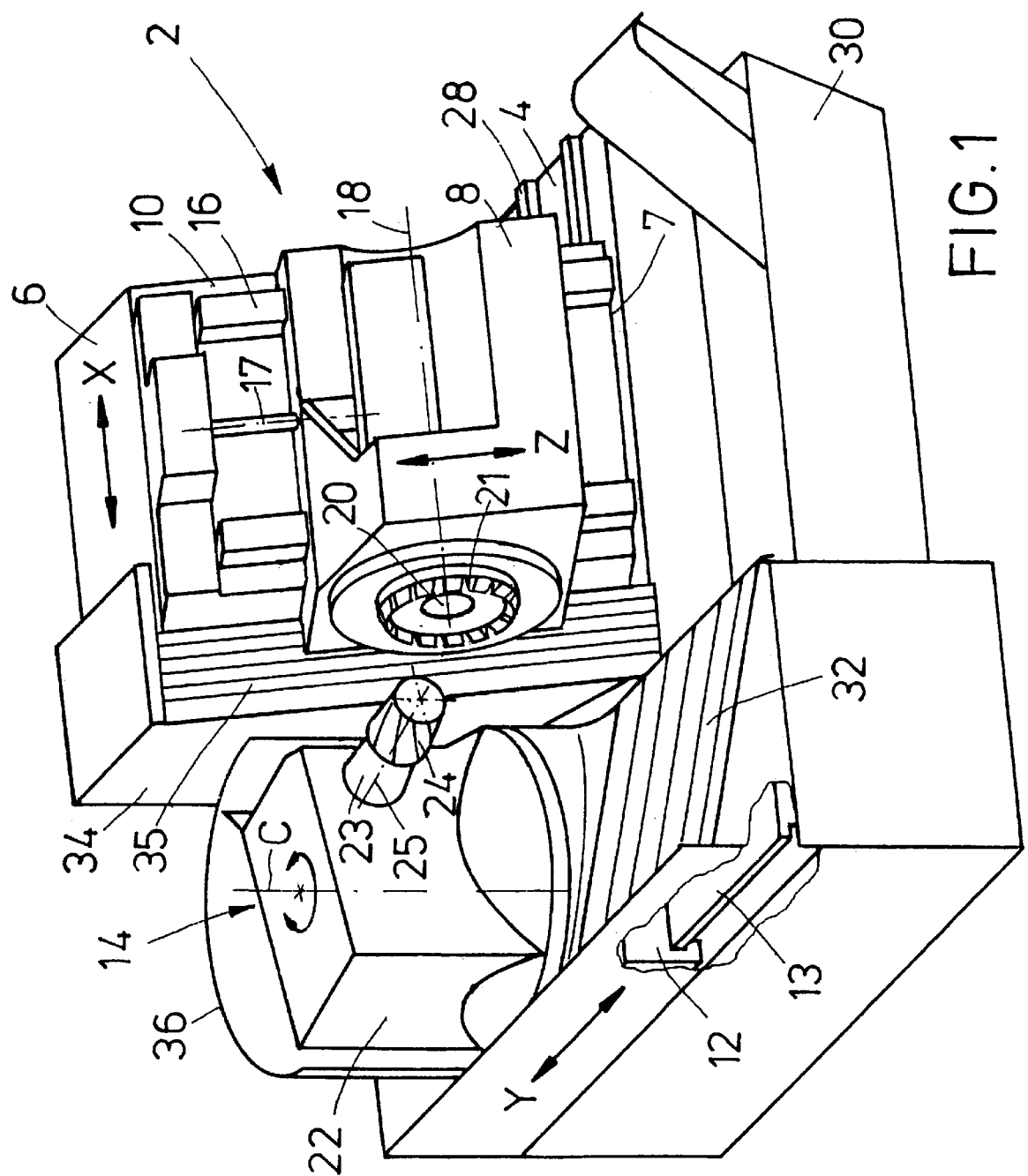
FIG. 1 shows a perspective view of the basic structure of a CNC machine in accordance with the invention for producing spiral-toothed bevel gears.

The basic structure of a CNC machine 2 for producing spiral-toothed bevel gears is shown in FIG. 1 in a perspective representation and in a view from the operator side. A machine housing 6 is horizontally and linearly guided along a straight coordinate axis X on a machine base 4 along at least one horizontal guide 28. A first carriage 8 can be displaced in height by means of a spindle drive 17 on a straight coordinate axis Z on a guide 16 disposed on a lateral surface 10 of the machine housing 6. A workpiece spindle support 14 with a second carriage 12 is horizontally and linearly guided on the machine base 4 along a straight coordinate axis along at least one horizontal guide 13, which is at right angles to the X-axis. A pivoting device 22 with a vertical axis C is located on the second carriage 12. The guide 16 of the first carriage 8 and the Z-axis are inclined in respect to the vertical direction. Because of this arrangement, the machine housing 6 tapers with increasing distance from the machine base 4. On the bottom it has a correspondingly wide base 7.

The first carriage 8 supports a tool spindle 20, which is supported for rotation around a tool spindle axis 18. The tool spindle 20 supports a tool 21, in this case by way of example a cutter head. Depending on the type of machining desired, the tool 21 can also be a grinding disk, a milling cutter, or the like.

A workpiece spindle 23 is horizontally guided on the machine base 4 by means of the second carriage 12 and the pivoting device 22, and is linearly displaceable and pivotable, respectively. The pivoting device 22 supports the workpiece spindle 23, which is rotatable around a workpiece spindle axis 25. The workpiece spindle 23 supports a workpiece 24, in the instant case a spiral-toothed bevel gear. The pivoting device 22 is horizontally pivotably guided around the C-axis in order to pivot the workpiece 24 from the loading position into a processing position and to perform movements during the gear cutting, if required.

The tool spindle axis 18 is parallel with the lateral surface 10. The lateral surface 10 has been selected from several lateral surfaces of the machine housing 6 for the attachment of the guide 16 with the first carriage 8, so that the tool spindle axis 18 is also parallel with the X-axis and is not located above an area of the machine 2 having one of the horizontal guides 28, 13 of the tool spindle support 14 or the machine housing 6.

The machine base 4 is recessed below the first carriage 8, and a chip collector 30 is disposed there, which is reached by the chips generated during gear cutting essentially under the force of gravity.

The upper area of the second carriage 12, which is not occupied by the pivoting device 22, has a concertina cover 32, which is oriented inclined toward the chip collector 30. The machine 2 furthermore has a sheathing 34, which is fixedly connected with the machine base 4 and is arranged between the machine housing 6 and the second carriage 12. The sheathing 34 is connected with the machine housing 6 by means of a concertina cover 35. The sheathing 34 and the concertina cover 35 are also oriented inclined towards the chip collector 30. A shielding 36 follows the sheathing 34, which surrounds the pivoting device 22 in the shape of a semicircle and is fastened on the second carriage 12.

At the start of the gear cutting process, the workpiece 24 is pivoted around the C-axis into a processing position. The tool 21 is moved by means of the horizontal movement of the machine housing 6 in the X-axis against the workpiece 24. In the simplest case a generating movement is created by the cooperation between the second carriage 12 in the direction of the Y-axis and the first carriage 8 in the direction of the Z-axis. In other cases a CNC control, not represented, sees to it that the three axes X, Y and Z and the rotations around the tool spindle axis 20, the workpiece spindle axis 25 and the pivot axis C simultaneously perform the required movements for the gear cutting process in a known manner. In this case the workpiece spindle 23 and the tool spindle 18 are arranged during gear cutting in such a way, that the workpiece 24 and the tool 21 are essentially located in the area of the machine 2 in which there is no horizontal guide.

What is claimed is:

1. A machine for producing spiral-toothed bevel gears comprising:
   a base having first and second transversely located horizontal guides;
   a housing horizontally guided in a straight coordinate axis on the first horizontal guide, the housing having a lateral surface with a third guide being disposed thereon;
   a first carriage mounted on the housing, the first carriage being displaceable in an upward and a downward direction along the third guide;
   a tool spindle supported on the first carriage, the tool spindle having a tool spindle axis, a tool being mountable on the tool spindle, the tool spindle axis being parallel with the straight coordinate axis;
   a second carriage mounted on the base, the second carriage being horizontally guided transverse to the straight coordinate axis on the second horizontal guide, the second carriage including a pivoting device mounted for movement about a vertical axis;
   a workpiece spindle support being located on the pivoting device, a workpiece spindle being supported by the workpiece spindle support, and a workpiece being mountable on the workpiece spindle, the first and second horizontal guides located away from an area beneath the tool spindle axis such that a chip collector can be mounted in an area of the base away from the first and second horizontal guides and that during gear cutting the workpiece spindle (23) and the tool spindle (20) come into engagement over the area of the base away from the horizontal guides.

2. The machine in accordance with claim 1, wherein the lateral surface has been selected in such a way that the tool spindle is located above an area of the machine which is free of the first and second horizontal guides.

3. The machine in accordance with claim 2, wherein a chip collector is arranged underneath the tool spindle, which chips essentially reach under the force of gravity.

4. The machine in accordance with claim 2, wherein the workpiece spindle and the tool spindle are disposed such that during gear cutting, the workpiece and the tool come into engagement at a location over the area of the machine which is free of the first and second horizontal guides.

5. The machine in accordance with claim 1, wherein the third guide for the first carriage is disposed on the machine housing in a further straight coordinate axis which is inclined in respect to the vertical direction.

6. The machine in accordance with claim 3, wherein the workpiece spindle and the tool spindle are disposed such that during gear cutting the workpiece and the tool come into engagement at a place which is essentially located over the area of the machine which is free of the first and second horizontal guides.

7. The machine in accordance with claim 2, wherein the first carriage has on the machine housing a guide in a further straight coordinate axis which is inclined in respect to the vertical direction.

8. The machine in accordance with claim 3, wherein the first carriage has on the machine housing a guide in a further straight coordinate axis which is inclined in respect to the vertical direction.

9. The machine in accordance with claim 4, wherein the first carriage has on the machine housing a guide in a further straight coordinate axis which is inclined in respect to the vertical direction.

* * * * *